Dec. 27, 1955     E. R. TENGBERG     2,728,558
MASONRY DRILL
Filed June 26, 1952

Inventor
Evert R. Tengberg
By Dike, Thompson and Sanborn
Attys.

United States Patent Office 2,728,558
Patented Dec. 27, 1955

2,728,558

MASONRY DRILL

Evert R. Tengberg, Dorchester, Mass., assignor to New England Carbide Tool Company, Inc., Cambridge, Mass., a corporation of Massachusetts Application June 26, 1952, Serial No. 295,760

1 Claim. (Cl. 255—63)

The present invention relates to percussion type drills such as are used to drill holes in masonry and concrete.

A percussion type drill is essentially a shaft with a hard point on the end. It is attached to an electric or compressed air hammer which hammers it down to make holes by chipping and pulverizing the material under the point. This is in contradistinction to rotary type drills, the points of which cut as the drill is rotated.

At present, percussion type drills are straight, smooth shafts with a point at one end, the circumference around the point being larger than the circumference of the shaft so that the shaft will not bind in the hole as would be the case if the shaft were of the same circumference as the point. However, in using this type of drill, the material powdered by the point is forced up in the hole and then settles down in the hole again where it is shaken and packed down against the back of the point by the vibration of the drilling. Unless the drill is lifted out of the hole frequently during the drilling and the powder taken out, usuall being blown out by compressed air, it will pack down into a solid plug around the shaft behind the point of the drill making it difficult or impossible to remove the drill from the hole. This is particularly true when drilling holes in green or uncured concrete in which the powdered uncured material packs into an especially hard plug, probably because it is cured by the heat of drilling. In any case, the powder formed by drilling holes in masonry will pack down into a solid immovable plug behind the point of the drill after a very short period of drilling.

I have discovered by making the shaft of the drill with helical grooves beginning near the point and circling the shaft along most of its length and forming a channel or channels lengthwise of the shaft and bisecting the grooves, an entirely different action results.

The helical grooves and the ridges or lands left between them keep the powder in the hole fluffed up during drilling and prevent it from packing down in back of the point. The channels allow chips to pass out of the hole and also allow release of the air pressure built up under the point of the drill by the hammer. Thus, this drill may be operated continuously to complete a hole as deep as the length of the drill without having to be removed at intervals to clean the powder out of the hole and without danger of the drill becoming irremovably locked in the hole by the powder packing behind the point. This results in a substantial saving of time and obviates the risk of damaging or losing expensive drills by having them still in the hole from which they must be pried out or abandoned as is frequently the case with the type of drills now being used.

Further objects and advantages will appear from the following description and accompanying drawings in which.

Figure 1:
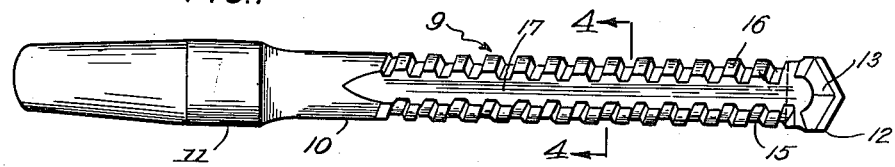
Fig. 1 is a side elevation of the drill of the present invention showing one of the channels cut lengthwise of the drill.

Referring now to the drawings, the drill 9, which is ordinarily made of steel, is a shaft 10 with a shank portion 11 at one end and a tip 12 forming a point at the opposite end. The shank portion 11 is fitted into an electrical or compressed air hammer when the drill is to be used.

Figure 2:
Fig. 2 is a side elevation of the drill of Fig. 1 rotated 90° on its lengthwise axis.

The point of the drill 9 is shown as being formed by a hard tip 12, preferably made of tungsten carbide, fixed in an appropriate groove across the end of the shank but the point of the drill of this invention may be any one of the usual types of point used on percussion type drills. The bottom end of this tip 12 is V-shaped, the edges of the V being bevelled and the sides extend a fraction of an inch beyond the circumference of the shaft as indicated most clearly in Fig. 5. The surfaces at the end of the shaft 10 adjacent the bottom end of the tip 12 are slanted back from the bevelled edges of the tip out to the circumference of the shaft as indicated at 13, Figs. 1, 2, and 3 to taper the shaft down in a smooth point, the leading edges of which are formed by the tip 12.

Figure 3:
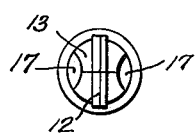
Fig. 3 is an end view of Fig. 1.
Figure 4:
Fig. 4 is a section along the line 4—4 of Fig. 1.

Helical grooves 15 are cut around the shaft 10 starting at the pointed end and extending around the shaft along the greater part of the length of the shaft leaving lands 16 between adjacent portions of the grooves. A channel 17 is cut lengthwise of the shaft 10 extending lengthwise from the pointed end along most of the length of the shaft and intercepting the lands and grooves. In Figs. 3 and 4, two channels 17 are shown on opposite sides of the drill but it will be understood that any number of channels may be cut in the shaft without departing from the spirit of this invention.

Figure 5:
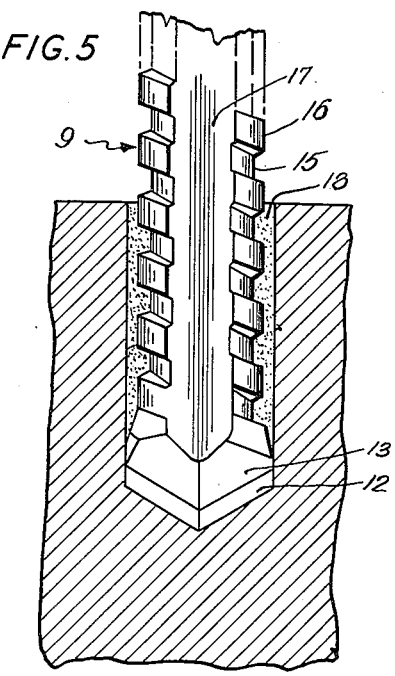
Fig. 5 is an enlarged side elevation showing the drill in a hole.

As shown in Fig. 5, the hole 18 made by the tip 12 of the drill 9 is slightly larger than the shaft 10. The clearance between the shaft 10 and the sides of the hole is sufficiently small so that as the hole deepens the shaft will be held straight by the hole and the point guided in a straight path. This clearance may be made very slight without danger of powder formed by the drilling working up along the sides of the drill and binding the drill in the hole. This powder collects in the grooves 15 and insufficient amounts of powder work up the sides of the drill to fill the grooves. In practice it has been found that the best results are achieved by having the tip 12 extend about 1/64 of an inch out from the circumference of the shaft on each side.

As the hole is drilled the drill vibrates and the grooves 15 and the lands 16 on the shaft 10 keep the powder formed by the drilling fluffed up and agitated in the hole. The lands 16 also form a series of shelves which keeps the powder in them separate from the powder in other sections of the hole. Thus the powder is prevented from packing down into a solid plug in the hole around the shaft in back of the point.

The channels 17 form vertical passages up from the point of the drill along the shaft to the top of the hole. As the drill is hammered down, air compressed under the point of the drill escapes up these channels 17 with explosive force which carries chipped and powdered material up out of the hole.

The combination of the helical grooves 15 and the channels 17 prevent the drill from becoming locked in the hole and keep the hole cleared of chipped and powdered material. This allows a hole to be completely drilled without interrupting the drilling at frequent intervals to loosen the drill and clean out the hole as is necessary when using drills of the type currently in use.

I claim:

A percussion operated masonry drill comprising in combination a round shaft having a plurality of closely spaced transverse grooves in its outer surface which surround the shaft from a head end thereof over a substantial portion of its length, a cutting tip portion supported at said head end, said tip portion comprising a hardened insert extending diametrically across the drill and having a pair of straight sharpened edges which converge to a central point and which extend beyond the external surface of the shaft and said shaft having longitudinal channels along the sides thereof, said channels being substantially deeper and wider than said transverse grooves thereby interrupting the bottoms of said transverse grooves, said channels extending lengthwise of the shaft from said head end across substantially all said transverse grooves.

References Cited in the file of this patent

UNITED STATES PATENTS

| | | |
|---|---|---|
| 237,013 | Hammond | Jan. 25, 1881 |
| 335,469 | Moreau | Feb. 2, 1886 |
| 1,216,628 | Teasck | Feb. 20, 1917 |
| 2,506,474 | Tilden | May 2, 1950 |
| 2,614,811 | Melendy | Oct. 21, 1952 |
| 2,635,856 | Scheffer | Apr. 21, 1953 |

FOREIGN PATENTS

| | | |
|---|---|---|
| 375,221 | Germany | May 13, 1922 |